United States Patent [19]

Nishijima et al.

[11] Patent Number: 4,738,157
[45] Date of Patent: Apr. 19, 1988

[54] STEERING WHEEL

[75] Inventors: Kazuyoshi Nishijima, Shizuoka; Tatsuro Doi, Yokohama, both of Japan

[73] Assignee: Nihon Plast Co., Ltd., Shizuoka, Japan

[21] Appl. No.: 914,526

[22] Filed: Oct. 3, 1986

Related U.S. Application Data

[63] Continuation of Ser. No. 556,487, Nov. 30, 1983, abandoned.

[30] Foreign Application Priority Data

Dec. 1, 1982 [JP] Japan ............................ 57-210890

[51] Int. Cl.⁴ .................... B62D 1/04; G05G 1/10
[52] U.S. Cl. .................................... 74/552; 29/159 B
[58] Field of Search ............... 74/552, 485, 558.5; 29/159 B; 340/56

[56] References Cited

U.S. PATENT DOCUMENTS

| | | | |
|---|---|---|---|
| 2,408,388 | 10/1946 | George | 74/552 |
| 2,617,902 | 11/1952 | Lincoln et al. | 340/56 X |
| 2,946,869 | 7/1960 | Parks et al. | 74/552 |
| 3,800,604 | 4/1974 | Barenyi | 74/552 |
| 4,306,466 | 12/1981 | Coveney | 74/552 |
| 4,635,500 | 1/1987 | Overcashier et al. | 74/552 |

FOREIGN PATENT DOCUMENTS

| | | | |
|---|---|---|---|
| 848458 | 7/1952 | Fed. Rep. of Germany | 74/552 |
| 623212 | 6/1927 | France | 74/552 |
| 776976 | 2/1935 | France | 74/552 |
| 2254960 | 7/1975 | France | 74/552 |
| 2281259 | 3/1976 | France | 74/552 |
| 2346195 | 10/1977 | France | 74/552 |
| 2577184 | 8/1986 | France | 74/552 |
| 2577185 | 8/1986 | France | 74/552 |
| 318614 | 6/1934 | Italy | 74/552 |
| 0089265 | 5/1984 | Japan | 74/552 |
| 0100055 | 6/1984 | Japan | 74/552 |
| 0100056 | 6/1984 | Japan | 74/552 |
| 0192669 | 11/1984 | Japan | 74/552 |
| 759953 | 10/1956 | United Kingdom | 74/552 |
| 1238644 | 7/1971 | United Kingdom | 74/552 |

Primary Examiner—Gary L. Smith
Assistant Examiner—Vinh Luong
Attorney, Agent, or Firm—Armstrong, Nikaido, Marmelstein & Kubovcik

[57] ABSTRACT

A steering wheel has a rim section, a hub section and a pair of spokes connecting the hub section to the rim section. The hub section includes a hub member of a metal including a cylindrical portion defining therein an axial bore for a steering shaft and an integral flange. The spokes include spoke cores made of a length of metal rod including a central arcuate bend extending along the junction between the cylindrical portion and the flange of the hub member, a pair of radially extending arms or opposite end portions and rising portions interconnecting the end portions and the central arcuate bend. The flange is formed therein with a pair of generally diametrically opposed notches with which the rising portions of the metal rod are engaged to form torque-transmitting connections. The hub member and the metal rod are rigidly secured together by a molded plastic layer surrounding the outer periphery of the hub member and the central arcuate bend and the rising portions of the metal rod.

7 Claims, 3 Drawing Sheets

STEERING WHEEL

This application is a continuation of application Ser. No. 556,487 filed 11/30/83 abandoned.

FIELD OF THE INVENTION

The present invention relates to an automotive steering wheel of the type that comprises a rim section, a hub section including a hub member of a metal adapted to be secured to a steering shaft and spokes mechanically connecting the hub section to the rim section.

DESCRIPTION OF THE PRIOR ART

In order to reduce the weight, increase the reliability and decrease the cost of manufacture of steering wheels of the type specified above, a steering wheel was proposed in the past which included a cylndrical hub member of a metal, an annular flange plate welded along its inner peripheral edge to the outer peripheral surface of the hub member at its one end, and spoke cores formed by a length of metal rod which included a central arcuate bend extending along a circular junction between the hub member and the flange plate and welded both to the hub member and the flange plate. The steering wheel also included a hub cover of a plastic material including a cylindrical section encircling and engaged with the other end of the hub member. The cylindrical section of the hub cover was formed thereon with a pair of radially projecting axial ridges disposed in diametrically opposed relationship and being adapted to cooperate with turn signal cancellation cam mounted on an associated steering column.

While the design of the proposed steering wheel referred to above was effective to reduce the weight, the steering wheel had a shortcoming that the metal rod had to be welded to the hub member and the flange plate to form a torque-transmitting connection between the hub section and the spokes. Because the torque-transmitting connection had to withstand a high magnitude of torque produced by the rotation of the rim section of the steering wheel, the welding operation had to be carried out in a strictly controlled optimum welding condition to assure that the welded section could provide a reliable high mechanical strength. A highly experienced skill was required to establish the optimum welding condition and to maintain this condition.

SUMMARY OF THE INVENTION

The present invention has its object to provide an automotive steering wheel in which a torque-transmitting connection between a hub section and spokes is not welded but provides a reliable mechanical strength.

The steering wheel according to the present invention comprises a rim section, a hub section, at least a pair of spokes mechanically connecting said hub section to said rim section, said hub section including a hub member of a metal, said hub member including a substantially cylindrical portion defining therein an axial bore for a steering shaft and a flange portion extending substantially radially outwardly from said cylindrical portion, said flange portion having a radially extending inner end face merging with an outer peripheral surface of said cylindrical portion to form a substantially circular junction, said flange portion being formed therein with a pair of notches, said pair of spokes including spoke cores made of a length of metal rod including a central arcuate bend extending along said circular junction over a predetermined angle about the axis of said hub section adjacent the inner end face, opposite end portions substantially radially outwardly extending from said hub section to form said spoke cores and a pair of rising portions extending between said central arcuate bend and said end portions, respectively, and engaged with said notches, respectively, to form torque-transmitting mechanical connections between said hub member and said metal rod, and means rigidly securing said metal rod and said hub member together, said securing means comprising a layer of a plastic material molded on at least a part of said hub member and at least a part of said metal rod so that at least said central arcuate bend of said metal rod and said torque-transmitting mechanical connections are embedded in said plastic layer.

As will be seen in the above, the torque produced by rotation of the rim section of the steering wheel of the present invention can reliably be transmitted to the flange portion of the hub member through the torque-transmitting connection formed by engagement of the rising portions of the metal rod with the radially outwardly open notches formed in the periphery of the flange portion of the hub member. The steering wheel can be manufactured without welding which would otherwise require a strictly controlled optimum welding condition. Thus, steering wheels according to the present invention can be produced with ease and at a reduced cost.

The above and other objects, features and advantages of the present invention will be made more apparent by the following description with reference to the accompanying drawings.

DESCRIPTION OF PREFERRED EMBODIMENTS

Figure 1:
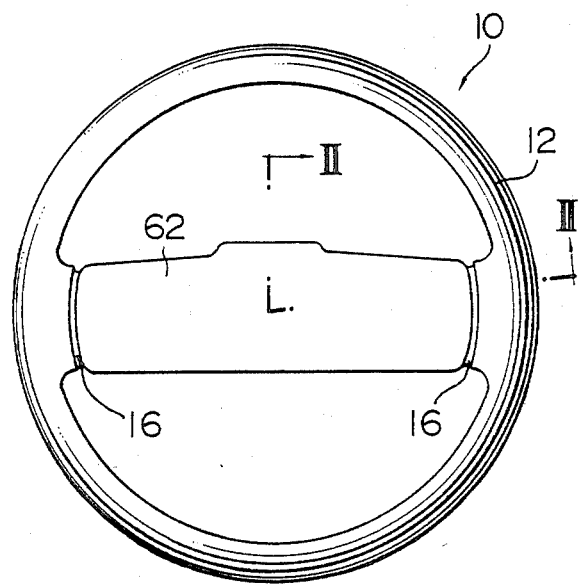
FIG. 1 is a plan view of an embodiment of a steering wheel according to the present invention.
Figure 2:
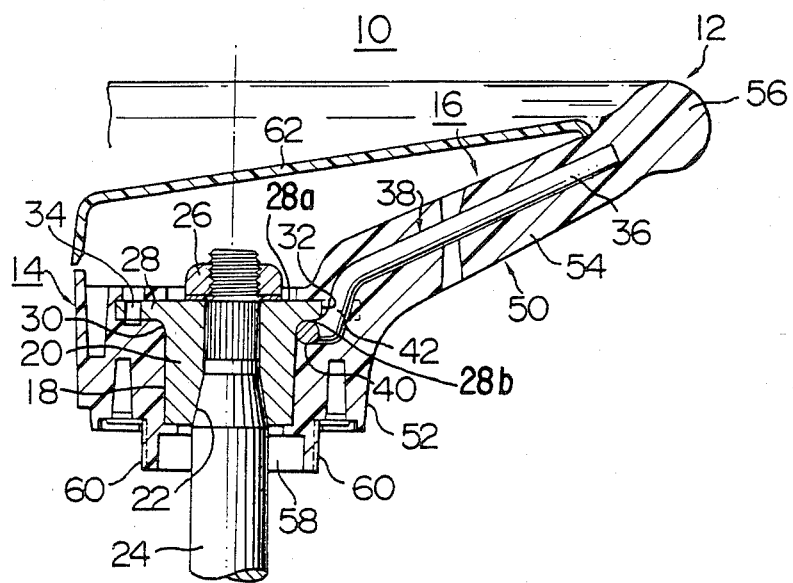
FIG. 2 is an enlarged fragmentary sectional view of the steering wheel taken along line II—II in FIG. 1.
Figure 3:
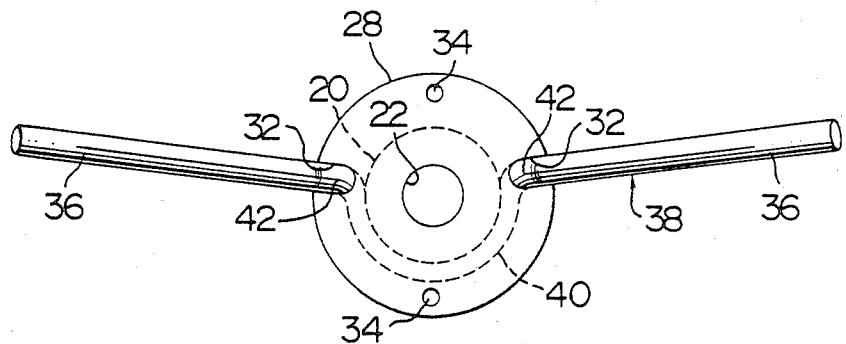
FIG. 3 is a plan view of as assembly of a hub member and a metal rod which forms spoke cores.

Referring to FIGS. 1-3, a steering wheel 10 includes a circular rim section 12, a hub section 14 and a pair of spokes one of which is shown by 16 in FIG. 2. The hub section 14 includes a hub member 18 of a metal. The hub member 18 includes a cylindrical portion 20 defining therein an axial bore 22 adapted to receive an upper end of an associated steering shaft 24 to be secured to the hub member 18 by means of a nut 26. The hub member 18 further includes an integral flange portion 28 extending substantially radially outwardly from the upper end of the cylindrical portion 20. The flange portion 28 has a radially extending outer face 28a and a second radially extending axially inner face 28b which merges with an outer peripheral surface of the cylindrical portion 20 to form a substantially circular junction 30 having an arcuate concave outer face. As will be seen in FIG. 3, the flange portion 28 is formed therein with a pair of notches 32 disposed in generally diametrically opposed relationship and having inner ends slightly radially outwardly offset from the junction 30. Each notch is radially outwardly open in the outer periphery of the flange portion 28. The flange portion 28 is also formed therein with a pair of threaded holes 34 for puller taps, the holes 34 being positioned in diametrically opposed relationship and angularly substantially equally spaced from the notches 32, respectively.

The spokes 16 includes a pair of spoke cores 36 made of a length of metal rod 38 which has a central arcuate bend 40 extending along the circular junction 30 over a predetermined angle about the axis of the hub member 18, a pair of arms or opposite end portions extending substantially radially outwardly from the flange portion 28 of the hub member 18 to form the spoke cores 36, and a pair of rising portions 42 extending between the central arcuate bend 40 and the opposite end portions of the spoke cores 36, respectively. It will be seen from the illustrations in FIGS. 2 and 3 that the central arcuate bend 40 is disposed under the flange portion 28, the end portions or spoke cores 36 are disposed above the flange portion 28 and the rising portions 42 extend through and are engaged with the notches 32 formed in the flange portion 28. The engagement between the notches 32 and the rising portions 42 of the metal rod 38 forms torque-transmitting connections operative to transmit torque from the spoke cores 36 to the flange portion 28 of the hub member 18.

The hub member 18 and the metal rod 38 are secured together in position shown in FIGS. 2 and 3 by means of an outer layer 50 of a hard plastic material, such as polypropylene, polyethylene, ABS, polyethylene terephthalate, polybutyl terephthalate, nylon or polyacetal, which may either be solely used or reinforced by glass or carbon fiber. The outer layer 50 includes a substantially circular hub covering 52, a spoke core covering 54 integral with the hub covering 52 and substantially radially outwardly extending therefrom to complete the spoke sections 16 and a circular solid rim 56 integral with the radial outer ends of the spoke core covering 54, the rim 56 forming the rim section 12 of the steering wheel 10.

The outer layer 50 can be molded on the hub member 18 and the metal rod 38 in such a manner that an assembly of the hub member and the metal rod shown in FIG. 3 is placed in a mold cavity and supported in position by means of support pins (not shown) and then a plastic material is molded on the assembly by any conventional molding process, such as injection molding or press forming, to form the outer layer 50.

In the illustrated embodiment of the invention, the hub covering 52 is provided with an integral cylindrical downward projection 58 concentric to the axis of the hub member 18. On the outer peripheral surface of the cylindrical projection 58 are formed a pair of radially outwardly projecting axial ridges 60 disposed in diametrically opposed relationship. When the steering wheel 10 is mounted in position on an associated car, the axial ridges 60 are adapted to be brought into engagement with a turn signal cancellation cam to return a turn signal lever to its initial or neutral position.

A cover member 62 of a plastic material is disposed above the hub section 14 and detachably secured to the spoke sections 16 by means of screws (not shown).

In operation, when the steering wheel 10 described above is secured to the steering shaft 24 of a car and rotated by a driver about the axis of the shaft 24, the torque is transmitted from the rim section 12 through the spoke sections 16 to the hub section 14 and thus to the steering shaft 24. More specifically, the torque is transmitted from the rim section 12 to the spoke cores 36 from which the torque is reliably transmitted to the flange portion 28 of the hub member 18 through the torque-transmitting connection formed by engagement of the rising portions 42 of the metal rod 38 with the notches 32 in the flange portion 28 of the hub member 18. The outer layer 50 is sufficiently strong enough to bear axial forces exerted to the steering wheel 10 by the driver.

In the illustrated embodiment of the invention, the flange portion 28 of the hub member 18 is preferably integral with the cylindrical portion 20. However, the flange portion 28 may alternatively be fabricated separately or independently of the cylindrical portion 20 and may be rigidly secured thereto by welding, for example.

The rising portions 42 of the metal rod 38 are shown as being inclined to the axis of the hub member 18. The rising portions 42, however, may alternatively be substantially parallel to the axis of the hub member 18. The notches 32 formed in the flange portion 28 may preferably have semi-circular or semi-oval shapes, respectively.

Figure 4:
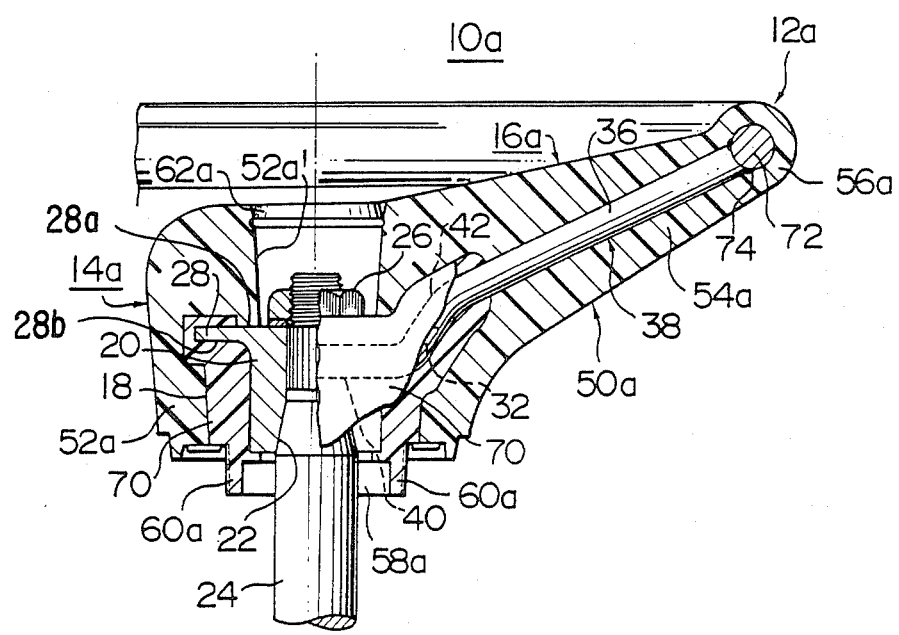
FIG. 4 is similar to FIG. 2 but illustrates a second embodiment of the steering wheel according to the present invention.

FIG. 4 shows a second embodiment 10a of the steering wheel according to the present invention, wherein the parts the same as in the first embodiment are designated by the same reference numerals. The difference only will be described hereunder. A hub section 14a includes a generally T-shaped intermediate layer 70 which surrounds the entire outer periphery of the hub member 18, the central arcuate bend 40 and rising portions 42 of the metal rod 38 to rigidly secure these members together. The spoke cores 36, which are formed by the radially outer end portions of the metal rod 38, extend radially outwardly from the intermediate layer 70 and have their outer end extremities welded at 74 to a circular rim core 72 of a metal. The intermediate layer 70 is formed by a molded plastic material which may be the same as the plastic material from which the outer layer 50 of the first embodiment is made. The layer 70 has an integral downward cylindrical projection 58a and axial ridges 60a formed thereon, as in the first embodiment.

The intermediate layer 70, the spoke cores 36 and the rim core 72 are covered with an outer layer 50a of a molded soft plastic material, such as foamed or non-foamed polyulethane, vinyl chloride or synthetic resin elastomer, which is molded by injection molding or RIM (reaction injection molding). More specifically, the outer layer 50a includes a substantially circular hub covering 52a surrounding the intermediate layer 70 to complete a hub section 14a of the steering wheel 10a, a spoke core covering 54a integral with the hub covering 52a and surrounding the spoke cores 36 to complete spoke sections 16a of the steering wheel, and a circular rim core covering 56a integral with the spoke core covering 54a and surrounding the rim core 72 to complete a rim section 12a of the steering wheel 10a.

The hub covering 52a is provided with a central recess or hole 52a' formed in the top of the hub covering to provide an access to the nut 26. The hole 52a' is normally closed by a removable lid 62a.

Figure 5:
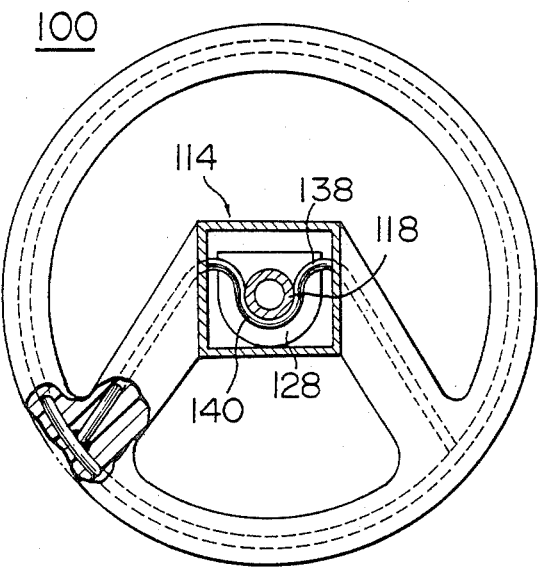
FIG. 5 is a bottom view of the prior art steering wheel with a part being cut away.
Figure 6:
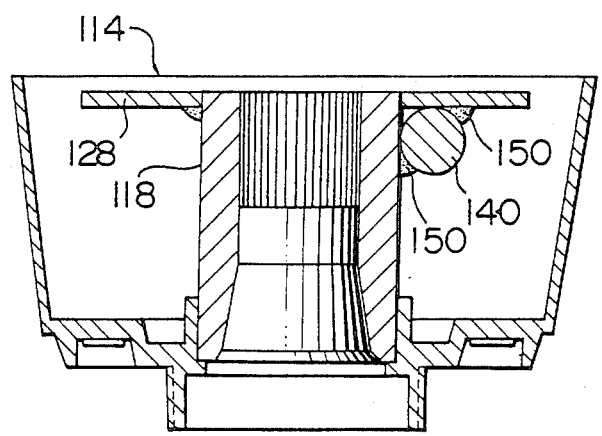
FIG. 6 is an enlarged axial sectional view of a hub section of the prior art steering wheel shown in FIG. 5.

In the prior art steering wheel 100 shown in FIGS. 5 and 6, the cylindrical hub member 118 is welded at one end to the annular flange plate 128. The central arcuate bend 140 of the metal rod 138 is welded at 150 both to the hub member 118 and the flange plate 128, as pointed out in the introductory part of this specification.

What is claimed is:

1. A steering wheel for mounting on and being operatively connected to a steering shaft which comprises:
   (a) a hub section including a metal hub member having a cylindrical portion defining a bore for a steering shaft and a flange portion extending radially outwardly from said cylindrical portion and having a first radially extending outer face and a second radially extending inner face which merges with an outer peripheral surface of said cylindrical portion to form a substantially circular junction, said flange portion having at least a pair of notches opening radially outwardly to the outer periphery of said flange portion between said first and second faces,
   (b) a rim section;
   (c) at least a pair of spokes connecting said member to said rim section, said spokes being formed of a one piece length of metal rod including a central substantially arcuate bend extending along said circular junction over a predetermined angle about the axis of said hub section below said flange, and rising portions respectively integrally connected to the opposite ends of said arcuate bend and extending substantially axially of said hub member through and engaged with said notches so that torque transmitting connections between said hub member and said metal rod are formed, said rod further including portions extending substantially radially outwardly from said rising sections toward said rim section, and
   (d) means rigidly securing said metal rod and said hub member together, said securing means comprising a layer of plastic material molded on at least a part of said hub member and at least said arcuate bend and said rising portions of said rod with said torque transmitting connections embedded in said plastic layer to secure said metal rod to said hub member and in said notches.

2. A steering wheel according to claim 1, wherein said rim section is formed by a solid plastic rim, and wherein said layer of plastic material includes a substantially circular hub covering surrounding the entire outer periphery of said hub member and said central arcuate bend and rising portions of said metal rod to complete said hub section integral with said hub covering and with said solid plastic rim and surrounding said rod portions extending radially outwardly from said rising sections.

3. A steering wheel according to claim 1, further including a cover member of a plastic material disposed above said hub section and removably secured to said spokes.

4. A steering wheel according to claim 1, wherein said layer of plastic material surrounds the entire outer periphery of said hub member and said central arcuate bend and said rising portions of said metal rod, said rim section including a substantially circular rim core of a metal rigidly secured to said spoke cores, said plastic layer, said spoke cores and said rim core being surrounded by an additional layer of a plastic material, said additional layer including a substantially circular hub covering surrounding the first-said plastic layer, a spoke core covering integral with said hub covering and surrounding said spoke cores and a substantially circular rim core covering integral with said spoke core covering and surrounding said rim core.

5. A steering wheel according to claim 4, wherein said hub member is adapted to be secured to said steering shaft by means of a nut, and wherein said hub core covering has a top which is formed therein with a recess providing an access to said nut, said recess being normally closed by a detachable lid member.

6. A steering wheel according to claim 1, wherein said plastic layer includes an integral substantially cylindrical downward projection coaxial to the axis of said hub member and a pair of axial ridges projecting radially outwardly from the outer peripheral surface of said downward projection and disposed in substantially diametrically opposed relationship.

7. A steering wheel according to claim 1, wherein said rim section includes a substantially circular rim core of metal rigidly secured to opposite ends of said metal rod and said rim core being covered with plastic material integral with said layer of plastic material.

* * * * *